United States Patent
Banry et al.

(10) Patent No.: US 6,944,949 B2
(45) Date of Patent: Sep. 20, 2005

(54) METHOD OF MAKING A MOTOR VEHICLE WHEEL ARCH, AND A WHEEL ARCH OBTAINED BY IMPLEMENTING THE METHOD

(75) Inventors: Pascal Banry, Bourg St Christophe (FR); Denis Gille, Oyonnax (FR); Pierre Cottet, Lantenay (FR); Philippe Gilotte, Benonces (FR)

(73) Assignee: Compagnie Plastic Omnium, Lyons (FR)

( * ) Notice: Subject to any disclaimer, the term of this patent is extended or adjusted under 35 U.S.C. 154(b) by 65 days.

(21) Appl. No.: 10/621,612

(22) Filed: Jul. 18, 2003

(65) Prior Publication Data

US 2004/0135362 A1 Jul. 15, 2004

(30) Foreign Application Priority Data

Jul. 18, 2002 (FR) .............................. 02 09145

(51) Int. Cl.[7] ................ B21D 53/88; B23P 19/04; B62B 9/14
(52) U.S. Cl. .................. 29/897.2; 29/460; 280/847
(58) Field of Search .................. 29/897.2, 897, 29/460, 527.2, 235; 280/847

(56) References Cited

U.S. PATENT DOCUMENTS 3,807,146 A  4/1974  Witkowski 6,349,987 B1  2/2002  Boulbon

FOREIGN PATENT DOCUMENTS

| DE | 37 12 882 A1 | 11/1988 |
| DE | 40 38 025 A 1 | 6/1992 |
| DE | 198 17 567 A 1 | 11/1999 |
| DE | 19930762 | * 12/1999 |
| DE | 10064398 | * 7/2002 |
| EP | 0 448 876 A2 | 10/1991 |
| FR | 2 816 266 | 5/2002 |

OTHER PUBLICATIONS

Kaufmann, "Werkzeug zu, Umspritzen schalldammender Textilen", Carl Hanser Verlag, Muchchen, Jahrg. 89(1999), pp 1118–120.

* cited by examiner

*Primary Examiner*—John C. Hong
(74) *Attorney, Agent, or Firm*—Oliff & Berridge, PLC

(57) ABSTRACT

A Motor vehicle wheel arch has a body of thermoplastic material with an opening and a mat closing the opening and fixed to the body by strips of thermoplastic material. A method of making the arch includes injecting the strips onto the mat and allowing them to solidify in contact therewith. An edge is formed on a reduced thickness portion of the strip. In cross-section, the edge thickness relates to the edge width l by a mathematical function f such that:

$$\int_0^l f(x)\,dx \geq h^2$$

where h is the height of the edge at its junction with the strip.

9 Claims, 3 Drawing Sheets

METHOD OF MAKING A MOTOR VEHICLE WHEEL ARCH, AND A WHEEL ARCH OBTAINED BY IMPLEMENTING THE METHOD

The present invention relates to a method of making a motor vehicle wheel arch and to the wheel arch obtained by implementing the method.

In the present description, the term "wheel arch" is used to designate the part that extends around the top portion of a wheel in a motor vehicle. This part is generally under a bodywork fender and serves to stop drops of water and other projectiles coming from the roadway.

Other terms commonly in use for this part include "wheel housing", "wheel well", "wheel valence", or even "mud-guard".

BACKGROUND OF THE INVENTION

Wheel arches are known as sources of noise because of the vibration and the impacts to which they are subjected while the vehicle is running.

A known solution for attenuating this phenomenon consists in replacing the rigid portion of the wheel arch that is exposed to projections coming from the rotating tire with a mat which serves to damp the impacts and the vibration to which it is subjected.

For example, German patent DE 1 981 756.7 discloses a wheel arch constituted by a body made of thermoplastic material and by a mat which occupies that portion of the body which is situated radially outwards from the wheel when the wheel arch is mounted on the vehicle.

The mat is subdivided into rectangles that are held by their edges, which are embedded in the body of thermoplastic material, which body includes strips of material between the mat rectangles.

These strips perform a stiffening function serving to prevent the mat from collapsing over the wheel, and secondly to stiffen the body as a whole, and thus to stiffen the wheel arch.

One of the advantages of such a wheel arch is that it can be made using a single injection molding operation, with the connection between the mat and the thermoplastic material being the result of the thermoplastic material in the molten state infiltrating into the thickness of the mat at the time of injection.

Nevertheless, that method suffers from the drawback that the molten thermoplastic material tends to infiltrate into the thickness of the mat beyond the edges of the rectangles.

In particular, the compacting stage accentuates this undesirable phenomenon of material infiltrating into the mat. The compacting stage is the second stage of the injection molding method, which method begins with a stage in which the mold is filled with molten material, followed by a stage in which said material is compacted, during which stage no additional material penetrates into the mold, but the pressure of the material is increased so as to ensure that the part retains its shape while the material is solidifying.

In addition, the mat can facilitate this infiltration if it includes non-uniformities in thickness or in density.

OBJECTS AND SUMMARY OF THE INVENTION

The present invention seeks to propose a simple and low-cost solution to the above-described problems.

The present invention provides a method of making a motor vehicle wheel arch comprising both a body of thermoplastic material provided with an opening, and a mat closing said opening and fixed to the body by strips of thermoplastic material secured to said body, the method comprising injecting the strips of thermoplastic material onto the mat, allowing them to solidify in contact with said mat, and forming on at least one strip of thermoplastic material an edge of thickness that is reduced relative to the thickness of the remainder of the strip, wherein, in cross-section, the thickness of the edge is related to the width l of the edge by a mathematical function f such that:

$$\int_0^l f(x)\,dx \geq h^2$$

where h is the height of the edge at its junction with the strip.

By means of this method, the edge of reduced thickness of the strip of thermoplastic material begins to solidify from the end of the filling stage and prior to the injected material being put under pressure during the compacting stage.

In this way, the edge of smaller thickness constitutes a barrier opposing infiltration into the mat by material that has not yet solidified and that is present in the remainder of the strip of thermoplastic material.

The above-specified inequality relationship concerning the function f represents the fact that, overall, the edge is wider than it is thick.

The barrier formed by the edge thus preferentially opposes infiltration of still-unsolidified material in directions parallel to the mat.

In a particular embodiment, the difference in thickness between the edge and the remainder of the strip is marked by a step, which makes it possible to define sharply the rapidly-solidifying edge constituting the anti-infiltration barrier.

In a particular embodiment of the invention, the periphery of the opening of the body forms the strips of thermoplastic material for fixing the mat to the body.

Such strips have only a single edge of smaller thickness, adjacent to the mat.

In another embodiment of the invention, compatible with the preceding embodiment, strips of thermoplastic material are formed in the orifice-closing region of the mat. These strips may optionally extend to the periphery of the opening.

In which case, each strip is adjacent to mat on both sides and preferably has two edges of smaller thickness, one on each side.

In the special case of a strip that is not connected to the periphery of the opening, it is advantageous to form an edge of reduced thickness over the entire outline of the strip.

In a particular embodiment, the two strips of plastics material are present on respective faces of the mat, which is sandwiched between said strips. These two strips form a rigid structure which imparts greater stiffness to the wheel arch.

The present invention also provides a wheel arch constituted by a body of thermoplastic material having an opening and by a mat closing said opening and fixed to the body by strips of thermoplastic material secured to said body, the strips being injected onto said mat and solidified in contact therewith, at least one strip having an edge of thickness that is reduced relative to the thickness of the remainder of the strip, wherein, in cross-section, the thickness of the edge is related to the width l of the edge by a mathematical function f such that:

$$\int_0^l f(x)\,dx \geq h^2$$

where h is the height of the edge at its junction with the strip.

BRIEF DESCRIPTION OF THE DRAWINGS

In order to facilitate understanding of the invention, there follows a description of non-limiting examples given with reference to the accompanying drawings, in which.

MORE DETAILED DESCRIPTION

Figure 1:
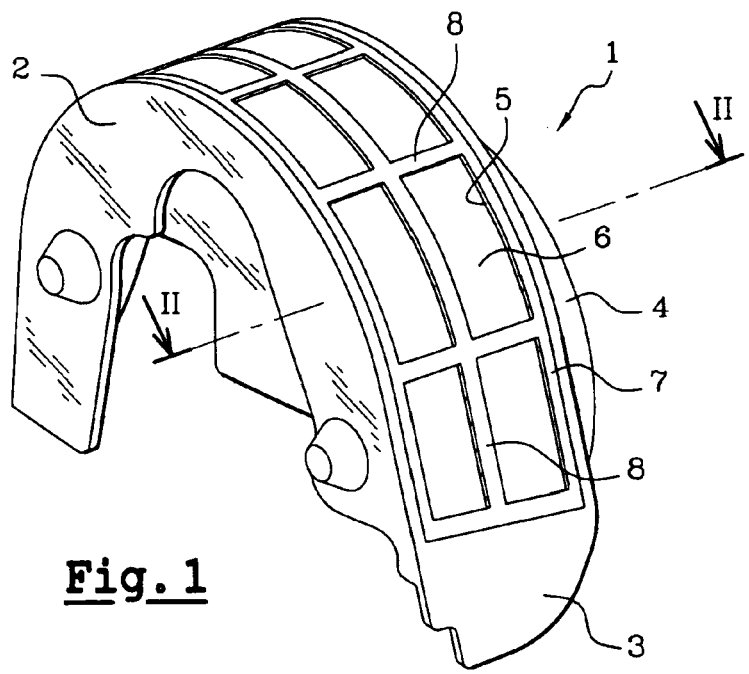
FIG. 1 is a three-quarters perspective view of a wheel arch in one embodiment of the invention.

The wheel arch shown in FIG. 1 comprises a body of generally conventional shape suitable for overlying a wheel (not shown). For this purpose, it comprises an inside flank 2 extended by a cylindrical portion 3, itself terminated by an outside rim.

Such a wheel arch is designed to be received inside a front right fender (not shown) of a motor vehicle.

A wide opening 5 is made in the cylindrical portion 3 which is in register with the wheel when the wheel arch is mounted on the vehicle.

As is known, this opening 5 is closed by a mat 6 which is connected to the body by localized overmolding. In this example, the overmolding regions are firstly the periphery 7 of the mat, and secondly mutually parallel and perpendicular bridges 8 of material extending transversely and longitudinally across the opening 5 and interconnecting opposite sides thereof in pairs.

The peripheries 7 of the bridges of material 8 are molded integrally with the solid portions of the body. They constitute strips of material in the meaning of the present description.

In order to make the wheel arch, a one-piece rectangle of mat occupying the entire opening 5 is placed in an injection mold (not shown) and thermoplastic material is injected into the mold whose cavity defines the solid portions of the body, i.e. its inside flank 2, the outside rim 4, and the portion surrounding the opening in the cylindrical portion 3, together with the bridges of material 8.

In the strips of material 7 situated at the periphery of the mat and in register with the bridges of material 8, the molten thermoplastic material penetrates into the mat and becomes bonded thereto on solidifying.

Figure 2:
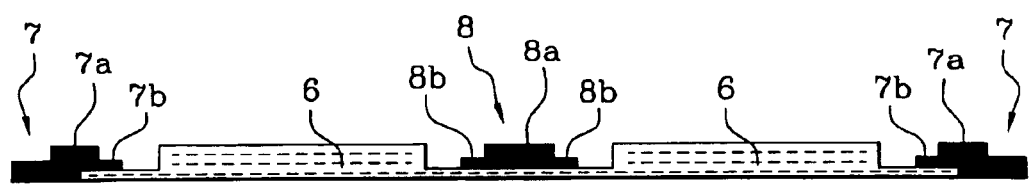
FIG. 2 is a section on II—II of FIG. 1.

As can be seen in the section of FIG. 2, these strips 8 of thermoplastic material comprise firstly a thick portion 8a dimensioned in such a manner as to impart the required stiffness to the wheel arch, and secondly an edge 8b of smaller thickness which, in the example shown, is clearly defined by a setback forming a step.

At the periphery of the mat, the edge 7b of smaller thickness is present only beside the impregnated zone making the junction with the mat. In the bridges of material, the edge 8b is present on both sides.

Once the injection stage has been completed, i.e. as soon as the mold cavity has been filled, the pressure of the thermoplastic material is increased so as to compact it in conventional manner.

At this specific instant marking the end of the injection stage and the beginning of the compacting stage, the edges 8b of smaller thickness in each impregnated region have begun to solidify so that compacting takes place without material infiltrating into the mat 6 in undesirable manner beyond the regions defined by the mold cavity.

Compacting can thus be performed in full without harming the effectiveness of the mat, which remains intact outside the impregnation zones.

Figure 3:
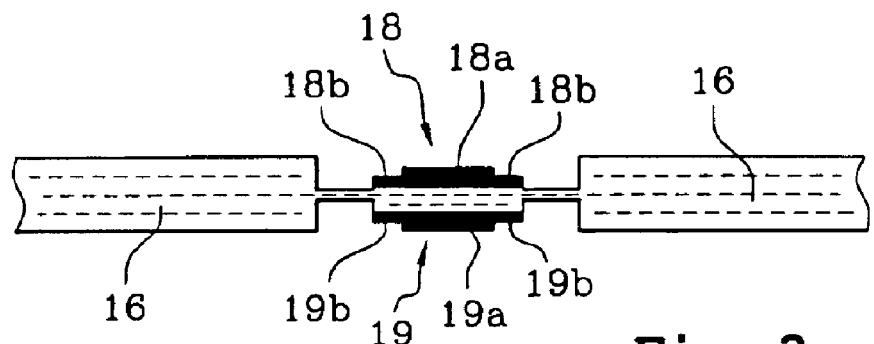
FIG. 3 is a section analogous to that of FIG. 2 through a wheel arch constituting another embodiment of the invention.

In the example of FIG. 3, the mat 16 is sandwiched between two strips 18 and 19 of plastics material that are situated on either side of said mat, i.e. on both faces thereof.

As described above, each strip presents a thick central portion 18a, 19a together with two edges 18b and 19b of smaller thickness.

The assembly constituted by the mat and the two strips forms a sandwich structure of greater stiffness, thereby increasing the overall stiffness of the wheel arch.

Figure 4:
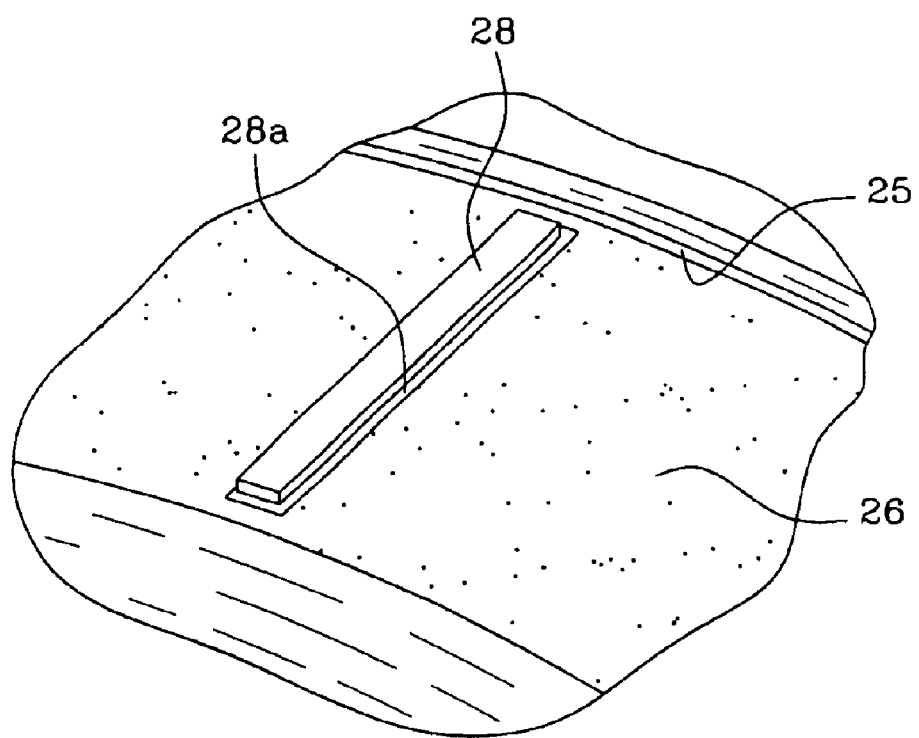
FIG. 4 is a perspective view of a portion of a wheel arch in another embodiment of the invention.

In the embodiment of FIG. 4, the wheel arch includes a strip 28 of plastics material having edges 28a of reduced thickness, which strip is overmolded on the mat 26 but is not connected to the periphery of the opening 25 in the wheel arch.

Such a strip may have various functions, and in particular the function of opposing vibration or resonance of the mat at certain critical frequencies of vehicle operation, by acting as a damping weight, while also performing a stiffening function.

Figure 5:
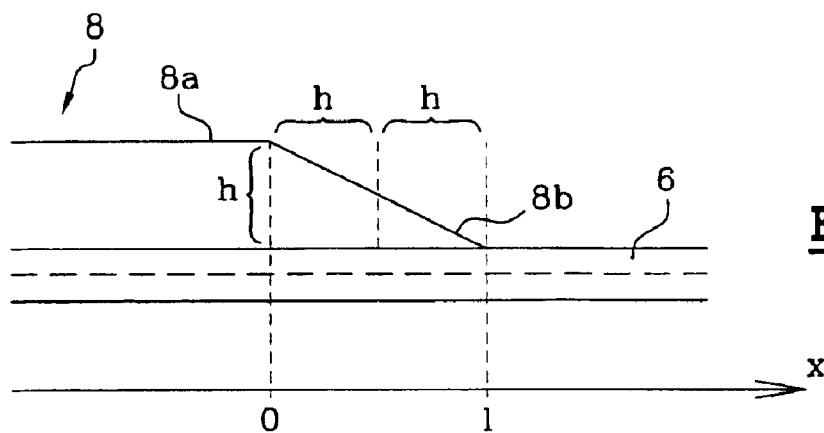
FIG. 5 is a section analogous to that of FIG. 2 showing an edge of thickness that decreases regularly.

The embodiment of FIG. 5 shows a strip provided with an edge of thickness that decreases in proportional manner along an abscissa axis x over a range 0 to 1, where 1 is the width of the strip. In this case, f(0)=h.

This constitutes a limiting case in which $$\int_0^l f(x)\,dx = h^2$$

At this limit, the cross-sectional area of triangularly-shaped edge is equal to $$\frac{2 \times h \times h}{2} = h^2$$

Figure 6:
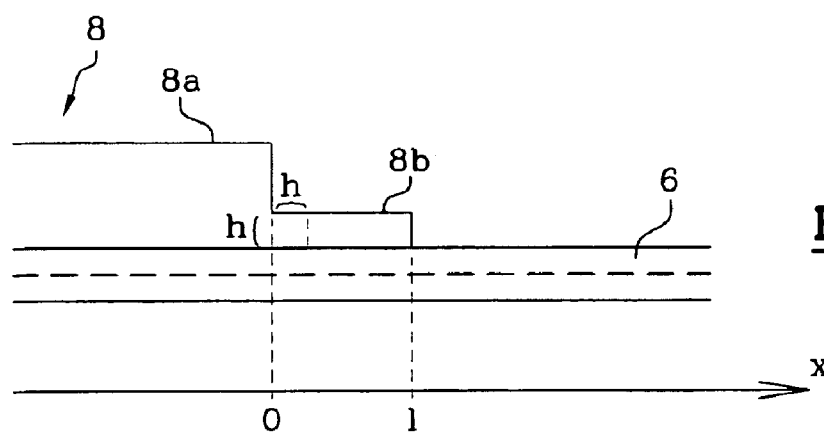
FIG. 6 is a section analogous to that of FIG. 2 showing an edge that presents a step.

FIG. 6 shows the case where the edge forms a setback constituting a step. The condition $$\int_0^l f(x)\,dx \geq h^2$$

then means that the step is of width greater than its height.

Figure 7:
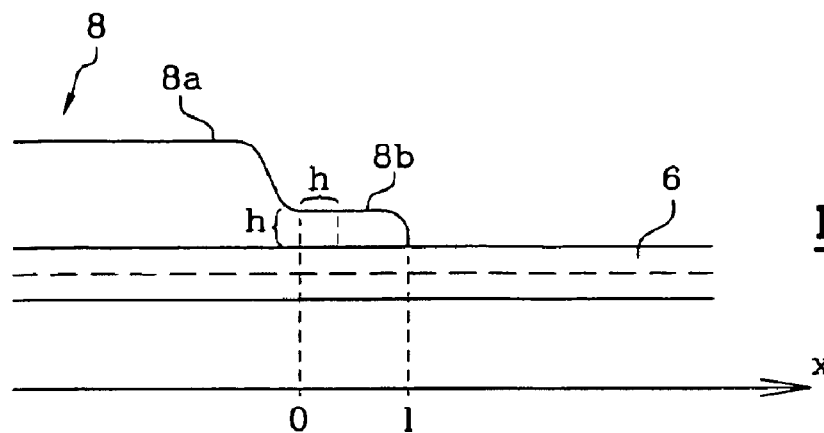
FIG. 7 is a section analogous to that of FIG. 2 showing an edge in another embodiment of the invention.

FIG. 7 shows the case where the junction between the strip and the edge is not sharply defined. The barrier function of the edge is ensured providing it is possible, in accordance with the invention, to position the junction in such a manner as to satisfy the inequality relationship:

$$\int_0^l f(x)\,dx \geq h^2$$

As can be seen in the drawing, this condition is indeed satisfied.

Naturally the above-described examples are not limiting in any way, with the scope of the invention being defined by the claims.

What is claimed is:

1. A method of making a motor vehicle wheel arch comprising both a body of thermoplastic material provided with an opening, and a mat closing said opening and fixed to the body by strips of thermoplastic material secured to said body, the method comprising injecting the strips of thermoplastic material onto the mat, allowing them to solidify in contact with said mat, and forming on at least one strip of thermoplastic material an edge of thickness that is reduced relative to the thickness of the remainder of the strip, wherein, in cross-section, the thickness of the edge is related to the width l of the edge by a mathematical function f such that:

$$\int_0^l f(x)\,dx \geq h^2$$

where h is the height of the edge at its junction with the strip.

2. A method according to claim 1, in which the difference in thickness between the edge and the remainder of the strip is marked by a step.

3. A method according to claim 1, in which the periphery of the opening of the body forms the strips of thermoplastic material for fixing the mat to the body.

4. A method according to claim 1, in which strips of thermoplastic material are formed in an opening-closing region of the mat.

5. A method according to claim 3, in which each strip is adjacent to the mat on both sides and preferably has two edges of smaller thickness, one on each side.

6. A method according to claim 1, in which two strips of plastics material are present on respective faces of the mat, which is sandwiched between said strips.

7. A method according to claim 1, in which at least one strip is connected to the periphery of the opening in the wheel arch.

8. A method according to claim 1, in which at least one strip is isolated from the opening in the wheel arch.

9. A wheel arch constituted by a body of thermoplastic material having an opening and by a mat closing said opening and fixed to the body by strips of thermoplastic material secured to said body, the strips being injected onto said mat and solidified in contact therewith, at least one strip having an edge of thickness that is reduced relative to the thickness of the remainder of the strip, wherein, in cross-section, the thickness of the edge is related to the width e of the edge by a mathematical function f such that:

$$\int_0^l f(x)\,dx \geq h^2$$

where h is the height of the edge at its junction with the strip.

* * * * *

UNITED STATES PATENT AND TRADEMARK OFFICE
CERTIFICATE OF CORRECTION

PATENT NO. : 6,944,949 B2
DATED : September 20, 2005
INVENTOR(S) : Banry et al.

It is certified that error appears in the above-identified patent and that said Letters Patent is hereby corrected as shown below:

Title page,
Item [73], Assignee, should read -- Compagnie Plastic Omnium, Lyon (FR) --.

Signed and Sealed this

Seventh Day of March, 2006

JON W. DUDAS
*Director of the United States Patent and Trademark Office*